R. B. JOHNSTON.
SHUT-OFF VALVE HANDLE SIGNAL AND LOCK SPRING.
APPLICATION FILED SEPT. 21, 1909. RENEWED FEB. 19, 1912.
1,040,343.
Patented Oct. 8, 1912.
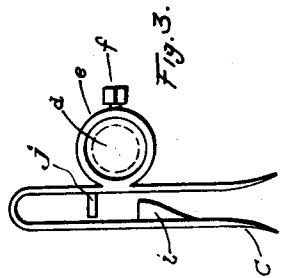
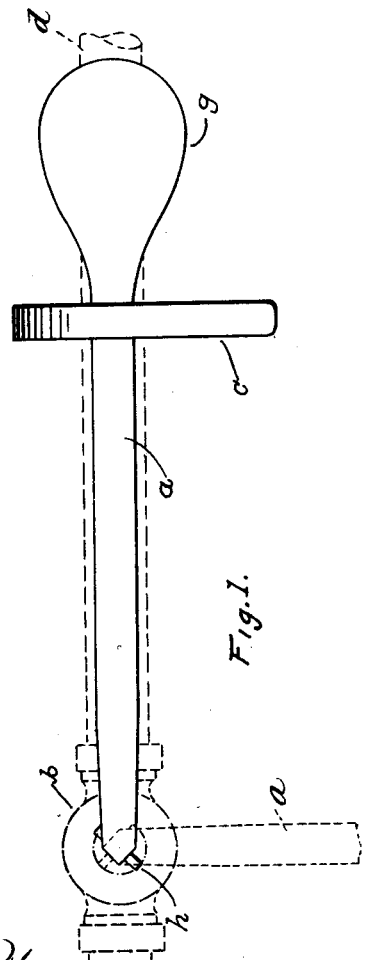
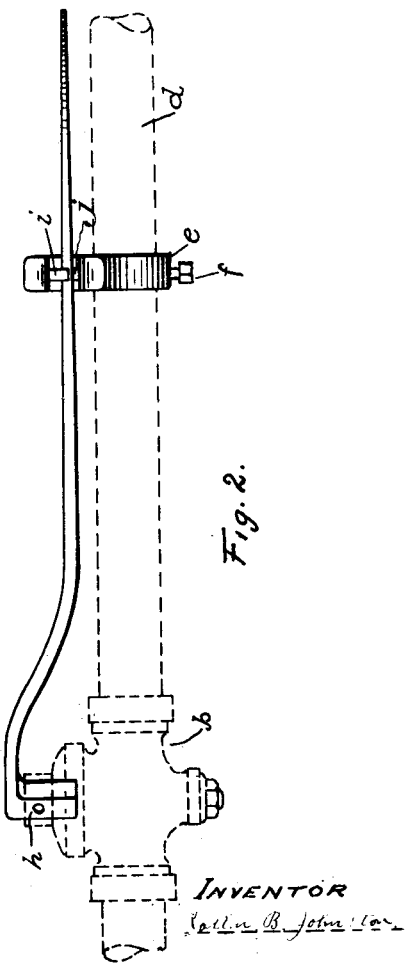

UNITED STATES PATENT OFFICE.

ROLLIN B. JOHNSTON, OF MANCHESTER, NEW HAMPSHIRE.

SHUT-OFF-VALVE-HANDLE SIGNAL AND LOCK-SPRING.

1,040,343.     Specification of Letters Patent.     Patented Oct. 8, 1912.

Application filed September 21, 1909, Serial No. 518,871. Renewed February 19, 1912. Serial No. 678,725.

*To all whom it may concern:*

Be it known that I, ROLLIN B. JOHNSTON, a citizen of the United States, residing at Manchester, in the county of Hillsboro and State of New Hampshire, have invented a new and useful Shut-Off-Valve-Handle Signal and Lock-Spring, of which the following is a specification.

My invention relates to shut-off valves installed in metal pipes for the conveyance of steam, water or other liquid, where it is necessary or desirable for convenience or safety that there be indicators showing clearly and instantly whether the valves are "open" or "closed" and means for safely locking such indicators in "open" position, but more particularly to an improvement in automatic sprinkler devices whereby the ordinary shut-off valve, of either the "globe" or "gate" type, well known to the trade, may with my invention attached, be installed and safely used to instantly close the flow of water in any branch pipe in case one or more of the sprinkler-heads thereon become damaged by accident or otherwise, without stopping the flow in the other branches in the same section, floor, or building, and clearly indicate such closure.

I am not aware of any safety device in the various automatic sprinkler inventions in actual use, which limits the flow of water in any one branch or distributing pipe for needed repairs, except the main shut-off valve for each floor, section, or building, as the case may be; and while in several patents valve arms, handles, levers or indicators are shown, they are universally with only one exception known to me, integral with or component parts of the sprinkler-heads, and in case of accident necessitating repairs to any head, the flow of water must be stopped at the main shut-off until such repairs are completed, as in No. 346,796, Joseph Andrew, automatic fire extinguisher, patented Aug. 3, 1886, and in No. 732,494, Fred M. Allen, automatic fire extinguisher, patented June 30, 1903; the one exception being the device shown in patent to Thomas, 570,689, Nov. 3, 1896 (169—21) which is clearly distinguishable from my invention principally in that the operating handle, termed the lever, is pivoted at one of its ends to an object independent of the piping, and is limited to the special straight piston-plunger-valve therein shown.

While the shut-off valve has been an article of commerce, well known and in use for many years, the combination of such valve with a greatly lengthened handle with its outer end so broadened as to attract notice, with a spring lock to securely hold the valve handle in "open" position, until manually forced out of the lock, and to "closed" position, is entirely new and novel.

In a working model of my invention, I have chosen to paint the broad, flat blade of the handle white, but any color most noticeable for any special installation could, of course, be used, as for instance, a phosphorus paint which would readily indicate the position of the handle by night as well as by day.

The nature of the invention is more fully described below and is illustrated in the drawing filed in the Patent Office with my original papers, in which similar letters of reference indicate corresponding parts.

Figure 1 is a view of my device attached to a water-pipe, with the handle-signal seated in its "open" position in the lock-spring, the "closed" position of the handle-signal indicated by dotted lines. Fig. 2 is also a view of my device in place on a water pipe in its "open" or normal position, with the handle-signal "open" in the lock-spring. Fig. 3 is a detail view of my lock-spring.

$a$ is the handle-signal attached to an ordinary shut-off valve $b$ by the headed pin $h$ so as to make the handle unattachable from the valve, or substantially an integral part of the valve.

$c$ is the lock-spring which is attached to the water pipe $d$ by the collar $e$ by the set-screw $f$ at an appreciable distance from the broad, flattened end $g$ of the handle, when the handle signal is in its "open" position, parallel with the pipe. The lock-spring and its collar are integral, preferably made of wrought steel and welded together in order to give this part the greatest possible strength. The spring is formed from one piece of steel and bent upon itself in the form of the letter U and at its ends bent outwardly to provide quick and easy entrance for the handle-signal when returned to its "open" position. The pin $j$ is welded to one of the arms of the spring at a point required to serve as a stop for the handle-signal when pressed to "open" position, and a latch or projection $i$ made an integral part of one of the arms of the spring, serves to hold the handle in its "open" position, until the spring is manually forced open to allow the handle-signal to be turned downward, and thence a quarter around to its "closed" position.

In actual operation, in connection with any automatic sprinkler system, in which my device is installed upon each branch pipe between the main supply pipe and the first sprinkler-head on the branch pipe, the handle-signal remains locked in the spring, until by any accident or neglect one or more of the sprinkler-heads require repairs necessitating the stoppage of the water-flow, when the handle-signal is manually turned downward by the forcible opening of the spring-lock, and thence to its "closed" position in a vertical line, with the disk or broadened end of the handle-signal in plain view. The handle signal by its peculiar shape will attract attention to its "closed" position, and insure its return, after repairs to the head, to locked or "open" position, by even a careless workman. Even if a careless workman should neglect to return the handle-signal to its "open" position, a superficial glance would show the fact.

Having fully described my invention, what I claim and desire to secure by Letters Patent, is:

1. In combination with a shut-off valve, a lengthened handle provided with a broadly flattened outer end, and a spring-lock comprising a spring composed of one piece of metal intermediately bent upon itself in substantially U shape, and provided with means to limit the movement of the handle in said spring, and a collar provided with means for securing the spring lock upon a pipe for the purpose stated.

2. In combination with a shut-off valve of any ordinary type a long handle extended at its outer end into a broad, flat surface, and a spring lock consisting of a spring formed by bending intermediately a single piece of metal in substantially U shape, with each end slightly curved outwardly, a pin attached to one of the arms of said spring to serve as a stop for the extreme open movement of the handle, a projection also attached to one of said arms to hold the handle in open position, and a collar provided with a hole for a set-screw to secure the spring-lock upon a pipe at proper distance from the valve, substantially as described.

ROLLIN B. JOHNSTON.

Witnesses:
ALBERT L. CLOUGH,
ALPHONSE C. HOVEY.